United States Patent
Han et al.

(10) Patent No.: US 10,951,885 B2
(45) Date of Patent: Mar. 16, 2021

(54) ADAPTIVE TEMPORAL FILTERING FOR ALTERNATE FRAME REFERENCE RENDERING

(71) Applicant: GOOGLE LLC, Mountain View, CA (US)

(72) Inventors: Jingning Han, Santa Clara, CA (US); Paul Wilkins, Cambridge (GB); Yaowu Xu, Saratoga, CA (US)

(73) Assignee: GOOGLE LLC, Mountain View, CA (US)

(*) Notice: Subject to any disclaimer, the term of this patent is extended or adjusted under 35 U.S.C. 154(b) by 194 days.

(21) Appl. No.: 16/117,563

(22) Filed: Aug. 30, 2018

(65) Prior Publication Data

US 2020/0077083 A1    Mar. 5, 2020

(51) Int. Cl.
*H04N 19/105*        (2014.01)
*H04N 19/182*        (2014.01)
(Continued)

(52) U.S. Cl.
CPC ......... *H04N 19/105* (2014.11); *H04N 19/117* (2014.11); *H04N 19/137* (2014.11);
(Continued)

(58) Field of Classification Search
CPC .. H04N 19/105; H04N 19/117; H04N 19/176; H04N 19/61; H04N 19/80; H04N 19/137; H04N 19/159; H04N 19/172; H04N 19/194; H04N 19/40; H04N 19/44; H04N 19/46; H04N 19/503; H04N 19/63; H04N 19/85; H04N 7/26244; H04N 7/26335;
(Continued)

(56) References Cited

U.S. PATENT DOCUMENTS 8,638,854 B1    1/2014   Bankoski et al.
9,172,957 B2   10/2015   Grange et al.
(Continued)

OTHER PUBLICATIONS

Bankoski, et al., "Technical Overview of VP8, An Open Source Video Codec for the Web", Jul. 11, 2011, 6 pp.
(Continued)

*Primary Examiner* — Joon Kwon
(74) *Attorney, Agent, or Firm* — Young Basile Hanlon & MacFarlane, P.C.

(57) ABSTRACT

A method for using an alternate frame reference (ARF) includes selecting an anchor frame and video frames, where the anchor frame includes an anchor block, and the anchor block includes an anchor pixel; identifying, for the anchor block of the anchor frame, respective reference blocks in the video frames; determining, for the anchor pixel and using an anchor patch, respective distances between the anchor pixel and respective co-located reference pixels of the respective reference blocks, where the anchor patch includes anchor patch pixels, and a respective distance, of the respective distances, between the anchor pixel and a respective co-located reference pixel is determined using the anchor patch pixels and co-located reference pixels; determining, using the respective distances, respective weights; determining, using the respective weights, an ARF pixel that is co-located with the anchor pixel; and encoding, in a compressed bitstream, the ARF.

20 Claims, 9 Drawing Sheets

(51) Int. Cl.
*H04N 19/167* (2014.01)
*H04N 19/177* (2014.01)
*H04N 19/117* (2014.01)
*H04N 19/137* (2014.01)

(52) U.S. Cl.
CPC ......... *H04N 19/167* (2014.11); *H04N 19/177* (2014.11); *H04N 19/182* (2014.11)

(58) Field of Classification Search
CPC .. H04N 7/26888; H04N 7/26941; H04N 7/50; H04N 19/00569; H04N 19/00715; H04N 19/107; H04N 19/114; H04N 19/127; H04N 19/139; H04N 19/157; H04N 19/17; H04N 19/177; H04N 19/179; H04N 19/182; H04N 19/186; H04N 19/23; H04N 19/51; H04N 19/527; H04N 19/573; H04N 19/82
See application file for complete search history.

(56) References Cited

U.S. PATENT DOCUMENTS

| | | | |
|---|---|---|---|
| 9,414,091 | B2 | 8/2016 | Pinhasov et al. |
| 9,756,331 | B1 | 9/2017 | Grange et al. |
| 10,397,600 | B1* | 8/2019 | Xu ......................... H04N 19/52 |
| 2001/0053183 | A1* | 12/2001 | McVeigh ............. H04N 19/105 375/240.16 |
| 2003/0118117 | A1* | 6/2003 | McVeigh ............. H04N 19/105 375/240.29 |
| 2009/0129465 | A1* | 5/2009 | Lai ....................... H04N 19/597 375/240.02 |
| 2010/0061461 | A1 | 3/2010 | Bankoski et al. |
| 2012/0257677 | A1 | 10/2012 | Bankoski et al. |
| 2013/0128965 | A1* | 5/2013 | Zhang .................... H04N 19/00 375/240.12 |
| 2014/0177714 | A1 | 6/2014 | Grange et al. |

OTHER PUBLICATIONS

Bankoski et al, "VP8 Data Format and Decoding Guide", Independent Submission RFC 6389, Nov. 2011, 305 pp.
Bankoski et al, "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Bankoski et al; "Technical Overview of VP8, An Open Source Code for the Web"; pp. 1-6.
WebM; "Inside WebM Technology: The VP8 Alternate Reference Frame"; http://www.webmproject.org/ May 27, 2010, pp. 1-3.
International Search Report and Written Opinion of International Application No. PCT/US2019/040951; dated Oct. 21, 2019, 11 pages.

* cited by examiner

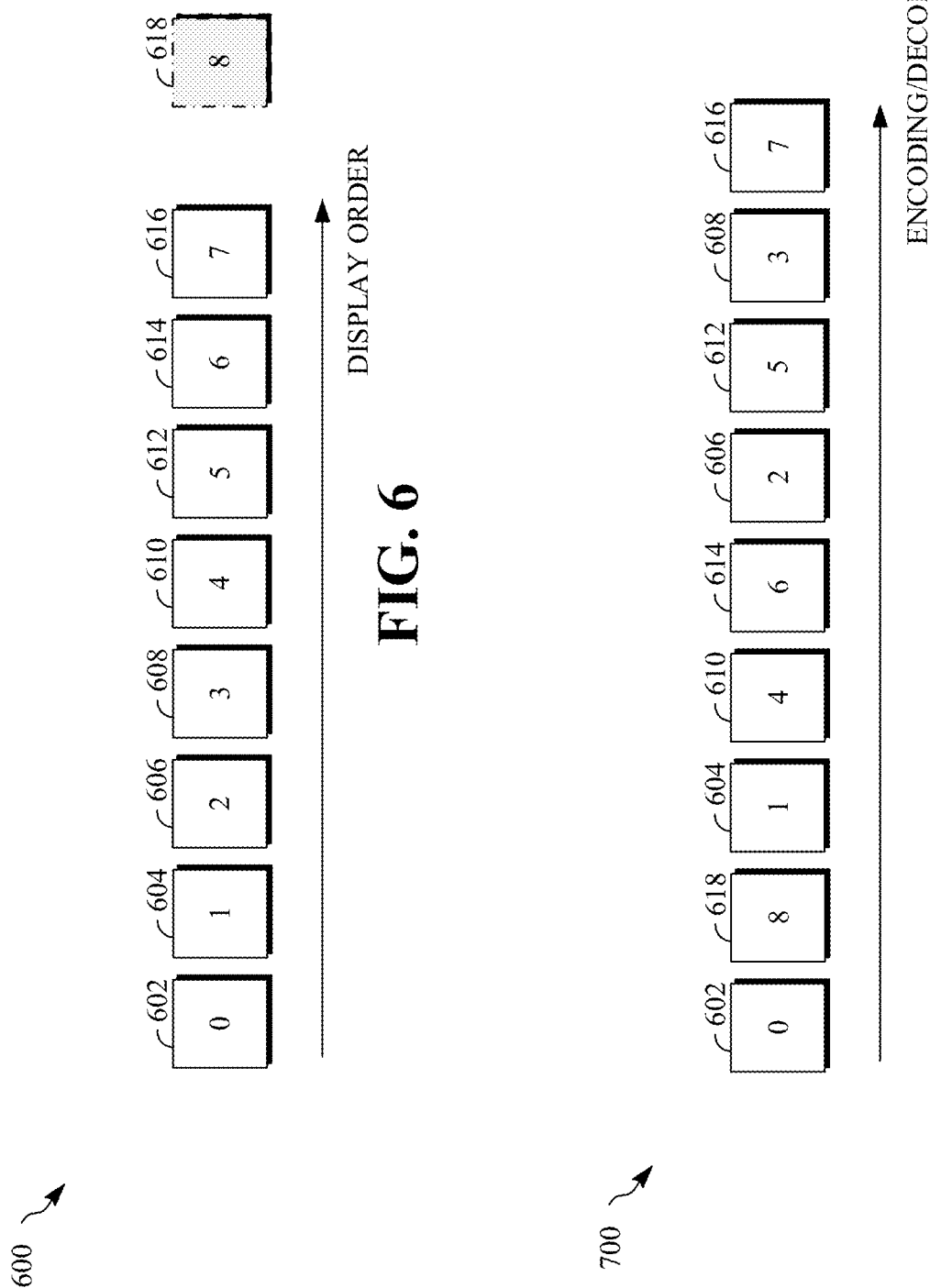

ADAPTIVE TEMPORAL FILTERING FOR ALTERNATE FRAME REFERENCE RENDERING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame to generate a prediction block corresponding to a current block to be encoded. Differences between the prediction block and the current block can be encoded, instead of the values of the current block themselves, to reduce the amount of data encoded.

SUMMARY

An aspect of this disclosure is a method for using an alternate frame reference (ARF). The method includes selecting an anchor frame and video frames, where the anchor frame includes an anchor block, and the anchor block includes an anchor pixel; identifying, for the anchor block of the anchor frame, respective reference blocks in the video frames; determining, for the anchor pixel and using an anchor patch, respective distances between the anchor pixel and respective co-located reference pixels of the respective reference blocks, where the anchor patch includes anchor patch pixels, and a respective distance, of the respective distances, between the anchor pixel and a respective co-located reference pixel is determined using the anchor patch pixels and co-located reference pixels; determining, using the respective distances, respective weights; determining, using the respective weights, an ARF pixel that is co-located with the anchor pixel; and encoding, in a compressed bitstream, the ARF.

Another aspect is an apparatus for using an alternate frame reference (ARF). The apparatus includes a memory; and a processor. The processor is configured to execute instructions stored in the memory to select an anchor frame and video frames, where the anchor frame includes an anchor block, and the anchor block includes an anchor pixel; identify, for the anchor block of the anchor frame, respective reference blocks in the video frames; determine, for the anchor pixel and using an anchor patch, respective distances between the anchor pixel and respective co-located reference pixels of the respective reference blocks, where the anchor patch includes anchor patch pixels, and a respective distance, of the respective distances, between the anchor pixel and a respective co-located reference pixel is determined using the anchor patch pixels and co-located reference pixels; determine, using the respective distances, respective weights; determine, using the respective weights, an ARF pixel that is co-located with the anchor pixel; and encode, in a compressed bitstream, the ARF.

Another aspect is an apparatus for decoding using an alternate frame reference (ARF). The apparatus includes a memory; and a processor. The processor is configured to execute instructions stored in the memory to decode, from a compressed bitstream, the ARF; and decode, using the ARF, frames from the compressed bitstream. An encoder generated the ARF by operations including selecting an anchor frame and video frames, where the anchor frame includes an anchor block, and the anchor block includes an anchor pixel; identifying, for the anchor block of the anchor frame, respective reference blocks in the video frames; determining, for the anchor pixel and using an anchor patch, respective weights based on respective patch-based distances between the anchor pixel and respective co-located reference pixels of the respective reference blocks; and determining, using the respective weights, an ARF pixel that is co-located with the anchor pixel.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views unless otherwise noted.

FIG. 6 is a diagram of a group of pictures in a display order of a video sequence according to implementations of this disclosure.

FIG. 7 is a diagram of an example of a coding order for the group of frames of FIG. 6.

DETAILED DESCRIPTION

Figure 1:
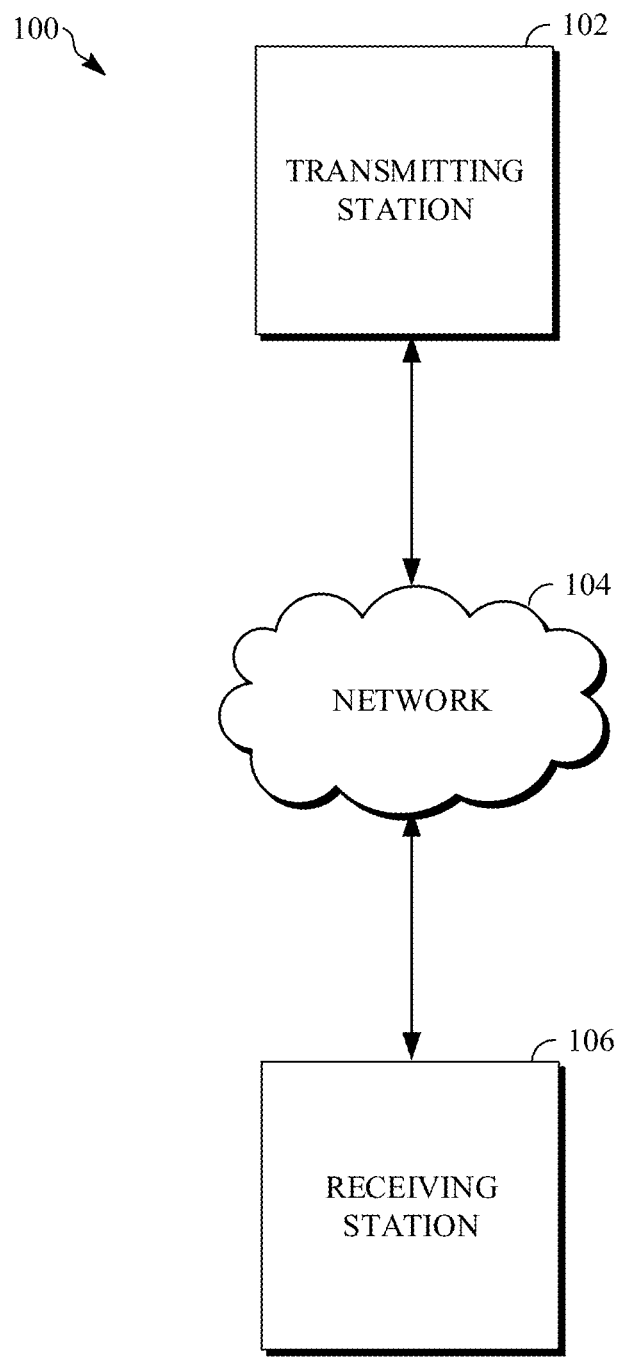
FIG. 1 is a schematic of a video encoding and decoding system.

A video stream can be compressed by a variety of techniques to reduce bandwidth required transmit or store the video stream. A video stream can be encoded into a bitstream, which involves compression, and is then transmitted to a decoder that can decode or decompress the video stream to prepare it for viewing or further processing. Compression of the video stream often exploits spatial and/or temporal correlation of video signals through spatial and/or motion compensated prediction. Motion compensated prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block. Motion compensated prediction may also be referred to as inter prediction.

Each motion vector used to generate a prediction block in the inter-prediction process refers to one or more frames (also referred to as reference frames) other than a current frame. Reference frames can be located before or after the current frame in the sequence of the video stream and may be frames that are reconstructed before being used as reference frames. In some cases, there may be three or more reference frames used to encode or decode blocks of the current frame of the video sequence. One may be a frame that is referred to as a golden frame. Another may be a most recently encoded or decoded frame. Another may be an Alternative Reference Frame (also referred to in this disclosure as an ARF).

An alternative reference frame is a reference frame usable for backwards prediction. While some ARFs are displayable by a decoder, implementations according to this disclosure relate ARFs that may not be displayed by a decoder because they do not directly correspond to a frame in the source video stream.

One or more forward and/or backward reference frames can be used to encode or decode a block. The efficacy of a reference frame when used to encode or decode a block within a current frame can be measured based on a resulting signal-to-noise ratio or other measures of rate-distortion.

As mentioned above, encoding video frames can occur, for example, using so-called "alternate reference frames" (ARFs) that may not be temporally neighboring to the frames coded immediately before or after them.

An ARF, according to implementations of this disclosure, can be a synthesized frame that does not occur in the input video stream and can be used for prediction. This disclosure related to synthesized alternate reference frames. A synthesized ARF is simply referred to as ARF in this disclosure.

An ARF is a frame of image data that is encoded into the bitstream and serves to improve the encoding (and the decoding) of other transmitted frames. An ARF can be used to provide a temporal filtered reference frame that can be used to filter out acquisition noise within one or more source frames.

Unlike a conventional reference frame, an ARF is not shown to the user after decoding. The ARF may not have the same dimensions as the video stream's raw image frames or the frames displayed to the user. Instead, the ARF serves as a predictor, giving frames a better predictive choice than actual past or future frames might offer.

Creating the best possible ARF is typically a task that is left to the encoder, which then encodes the ARF in a compressed bitstream for use by a decoder. This provides a benefit in that the decoder need not re-perform the computations used to create the ARF. Computationally-expensive processes can be used by the encoder to derive the ARF, thus permitting faster, lighter and more efficient decoding.

The alternate reference frame (ARF) can be rendered (i.e., synthesized, created, etc.) by applying temporal filtering to several original frames. The several original frames can be consecutive frames. Thus, common information of the several original frames can be captured in the ARF, which is encoded, in addition to the regular frames (i.e., the frames of the source video stream), in the compressed bitstream. The reconstructed ARF can serve as one motion-compensated reference frame, alongside other regular reconstructed frames. Some video codecs (such as VP8, VP9, and AV1) employ an ARF to achieve significant compression performance gains.

The temporal filtering can capture the common information across the consecutive frames. The efficacy of the temporal filtering technique used can substantially impact the overall compression performance. Reference frames that are used for generating an ARF (such as described with respect to FIGS. 8-10) are to be differentiated from reference frames that are used for inter-prediction. That is, for example, such reference frames may not be added to a reference frame buffer and/or used for encoding and decoding other video frames into a compressed bitstream. That is, these reference frames may not necessarily be used for determining motion vectors and/or residuals that are encoded in the compressed bitstream.

In a conventional approach of creating an ARF, temporal filtering can be used to evaluate the similarity between two blocks, an anchor block and a reference block of a reference frame, aligned in a motion trajectory, to determine a weight coefficient to be used for the pixels of the reference block. The weight is uniformly applied to all the pixels in the block to create a temporally filtered block. Such approach largely ignores the variation in statistics across the processing block unit. For example, in a 16×16 processing block unit, there are 256 pixels. In the conventional approach, the same weight is applied to each of the 256 pixels. As such, the conventional approach ignores (e.g., does not make use of, is not sensitive to, etc.) the local information in the neighborhoods of each of the 256 pixels.

Implementations according to this disclosure use adaptive temporal filtering. Adaptive temporal filtering aligns the blocks (e.g., 16×16-pixel blocks) in a motion trajectory, as further described with respect to FIG. 10. For example, given an anchor block, adaptive temporal filtering finds motion-aligned reference blocks in reference frames. However, instead of, as described with respect to the conventional approach (i.e., applying a weight coefficient uniformly to each of the pixels of the block), each pixel is processed individually taking into consideration the local variations in the neighborhood of the pixel.

In an example, a pixel patch (e.g., a pixel patch of size 3×3, or simply, a 3×3-pixel patch) surrounding an anchor pixel can be used to determine a weight that is used for a reference pixel (i.e., a pixel in a reference frame) when determining the value of an ARF pixel in the ARF that is co-located with the anchor pixel. A distance (between the pixel patch in the anchor frame and a corresponding (e.g., based on motion search) patch in the reference frame can then be used to determine the weight for a pixel of the reference frame. The weight of the target pixel is then used in the temporal filtering, as further described below. The distance can be in L2 norm (i.e., the mean squared error). The distance can be evaluated to decide the weight coefficient value per pixel.

As such, an encoder according to implementations of this disclosure can identity temporal consistencies at the pixel level (i.e., on a per-pixel basis), thereby only filtering those pixels that belong to the same motion trajectory as a target pixel and leaving out those that are not from the same motion trajectory (e.g., pixels that may be parts of objects other than the object of the target pixel). The temporal filtering described herein to generate an alternate reference frame can better preserve common information in the frames that are used to generate the ARF, thereby reducing any unique noise that may be embedded in a source frame that is used as an anchor frame. The noise can be acquisition noise related to a video or image capture device.

In some implementation, and as further described below, the collocated luminance and chrominance components can be jointly considered to better classify whether the aligned pixels belong to the same motion trajectory.

Implementations according to this disclosure can improve temporal filtering accuracy, which can result in substantial compression performance gain.

References to "pixel value" can be understood to mean, as the context makes clear, the pixel value of at least one of the color components of the pixel. For example, in a case where the RGB color system is used, then "pixel value" can mean, the red value of the pixel, the green value of the pixel, the blue value of the pixel, or a combination thereof. In the case where the YUV color system is used, then a pixel value can mean, the luminance (i.e., Y) value of the pixel, one of the color-difference chrominance components (i.e., U and/or V), or a combination thereof. As such, "pixel value" can be one or more color component values.

Further details of adaptive temporal filtering for alternate frame reference rendering are described herein with initial reference to a system in which the teachings herein can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
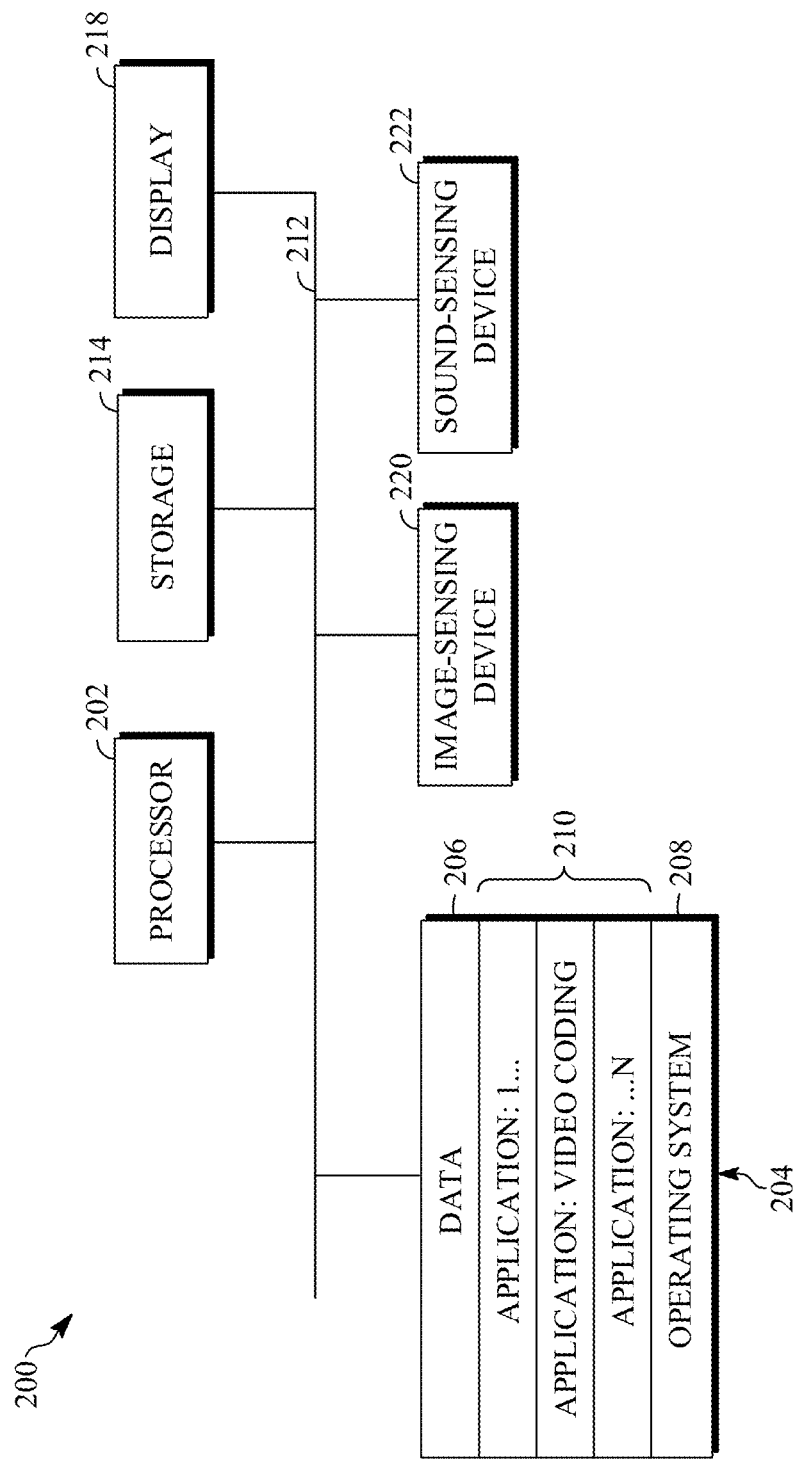
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device, a random-access memory (RAM) device, other type of memory, or a combination thereof. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
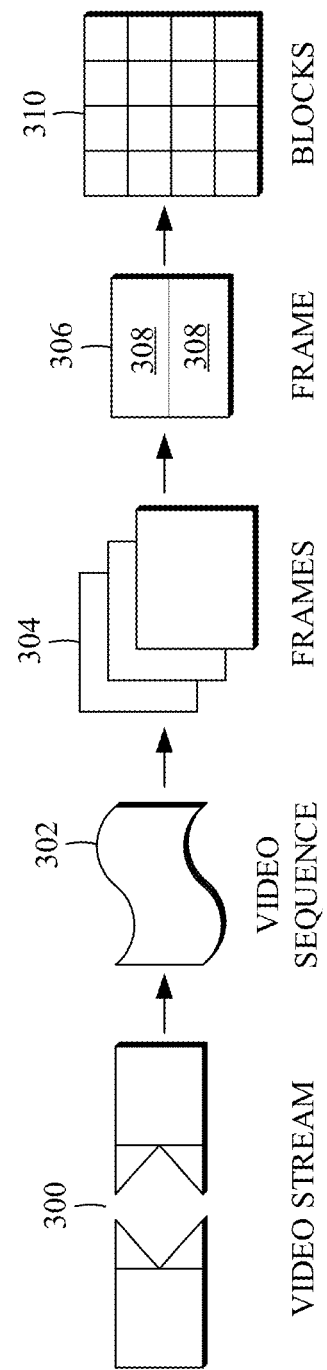
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
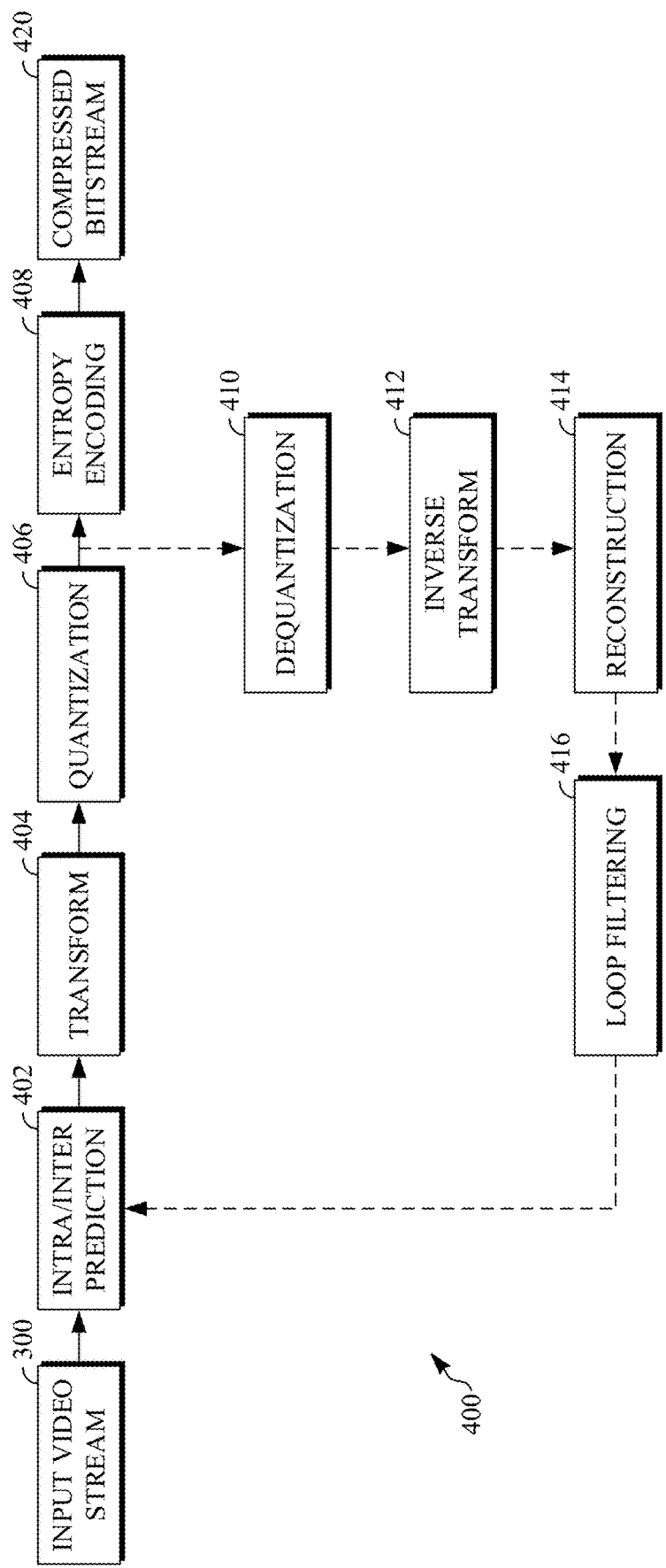
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. The designation of reference frames for groups of blocks is discussed in further detail below.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames.

In another implementation, an encoder can have the quantization stage 406 and the dequantization stage 410 combined in a common stage.

Figure 5:
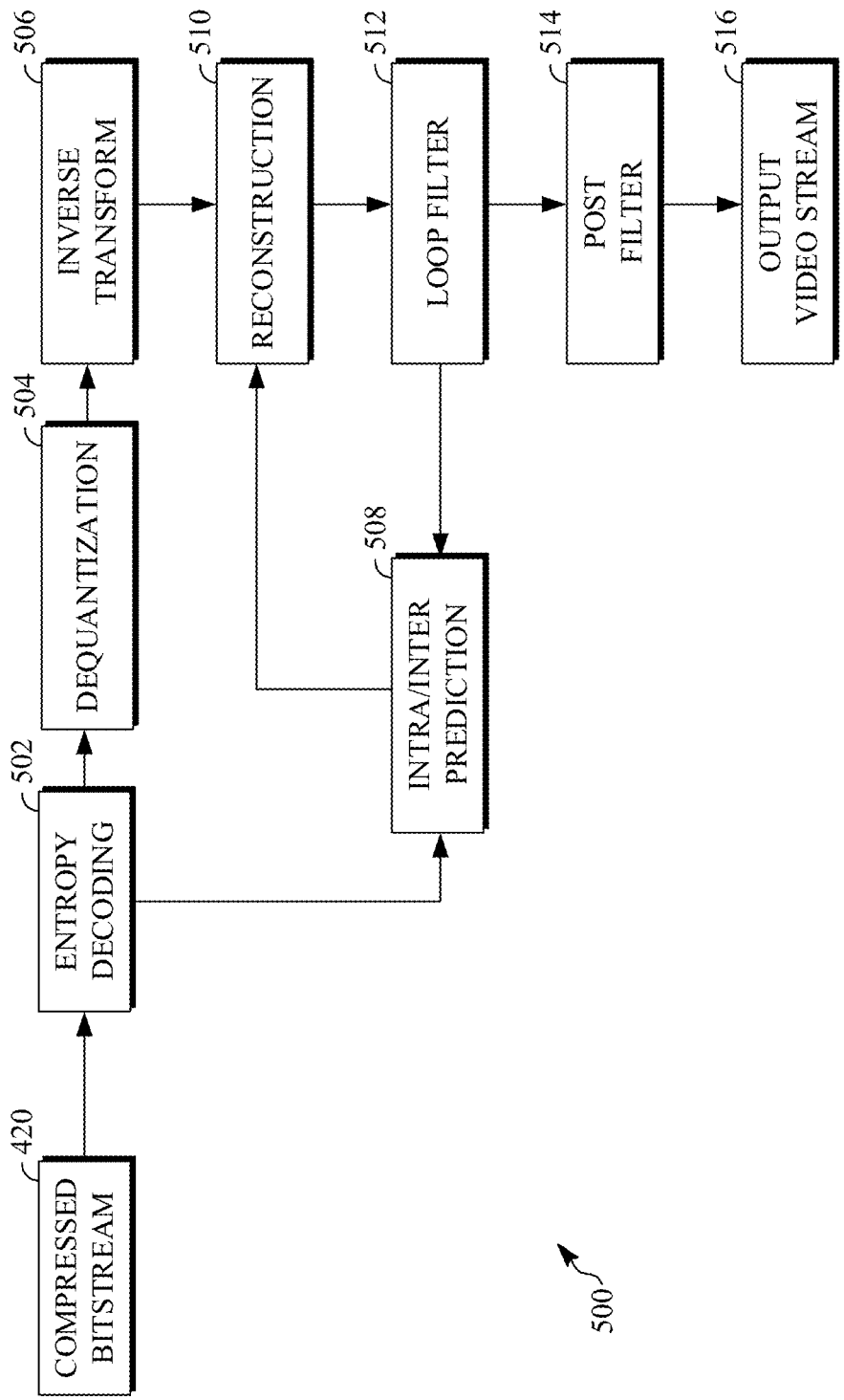
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the post filtering stage 514 may be a deblocking filter that is applied to the reconstructed block to reduce blocking distortion. The result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post filtering stage 514.

As is known in the art, a reference frame buffer may store reference frames (such as an ARF) used to encode or decode blocks of frames of a video sequence. For example, reference frames may be identified as a last frame LAST_FRAME, a golden frame GOLDEN_FRAME, or an alternative reference frame ALTREF_FRAME. The reference buffer can include additional reference frames. In an example, up to eight reference frames can be stored in the reference frame buffer and used in inter prediction. A frame header of a reference frame may include a virtual index to a location within the reference frame buffer at which the reference frame is stored. A reference frame mapping can map the virtual index of a reference frame to a physical index of memory at which the reference frame is stored. Where two reference frames are the same frame, those reference frames will have the same physical index even if they have different virtual indexes. The number and type of reference frames stored within a reference frame buffer may differ.

The reference frames stored in a reference frame buffer can be used to identify motion vectors for predicting blocks of frames to be encoded or decoded. Different reference frames may be used depending on the type of prediction used to predict a current block of a current frame. For example, in bi-prediction, blocks of the current frame can be forward predicted using either frame stored as the LAST_FRAME or the GOLDEN_FRAME, and backward predicted using a frame stored as the ALTREF_FRAME. More reference frames can also be available.

FIG. 6 is a diagram of a group of pictures (GOP) 600 in a display order of the video sequence according to implementations of this disclosure. The GOP 600 can also be referred to as a group of frames. The GOP 600 includes a consecutive group of frames of a video stream. In this example, the GOP 600 includes eight frames, namely the frames 602-616. However, a GOP can have more or fewer pictures (i.e., video frames). The number of frames forming each group of pictures can vary according to the video spatial and/or temporal characteristics and other encoder configurations, such as the key frame interval selected for random access or error resilience, for example.

The GOP 600 is also shown to include an ARF 618. The ARF 618 is shown as shaded as it is not a frame of the video stream. The ARF 618 can be thought of as logically being at a location in the video sequence following the frame 616. The ARF 618 is a derived (i.e., constructed, synthesized, etc.) frame according to implementations of this disclosure.

In an example, the frame 602, which is the first frame of the GOP 600, can be referred to as a key frame. No block within the frame 602 is inter predicted. The predicted blocks within the frame 602 may only be predicted using intra prediction. In another example, the frame 602 can be referred to as an overlay frame, which is an inter-predicted frame that can be a reconstructed frame of a previous group of frames. In an inter-predicted frame, at least some of the predicted blocks can be predicted using inter prediction.

The coding order for a GOP can differ from the display order. This allows a frame located after a current frame in the video sequence to be used as a reference frame for encoding the current frame. A decoder, such as the decoder 500, can share a common group coding structure with an encoder, such as the encoder 400. A group coding structure assigns different roles that respective frames within the group may play in the reference buff (e.g., a last frame, an alternative reference frame, etc.) and defines or indicates the coding order for the frames within a group.

FIG. 7 is a diagram of an example of a coding order 700 for the group of frames of FIG. 6. Because the encoding and decoding order is the same, the order shown in FIG. 7 is generally referred to herein as a coding order. The key or overlay frame 602 can be designated as the golden frame (e.g., GOLDEN_FRAME) in a reference frame buffer. The ARF 618 can be encoded next and is designated as an alternative reference frame (e.g., ALTREF_FRAME) in the reference frame buffer. In this coding order, the ARF 618 is coded out of the display order after the frame 602 so as to provide a backward reference frame for each of the remaining frames 604-616. Blocks of the ARF 618 can be inter-predicted (for example, the frame 602 can serve as an available reference frame for at least some blocks of the ARF 618), intra-predicted, or a combination thereof. The ARF 618 can be encoded using, as reference frames, the golden frame and reference frames reconstructed from frames of prior GOPs.

FIG. 7 is only one example of a coding order for a group of frames. The important aspect of the coding order 700 is that the ARF 618, which is not a frame that is part of the video stream, is encoded (e.g., is a second frame to be encoded) in a compressed bitstream that is received by a decoder, and that the ARF is encoded before most of the frames of the GOP 600.

While the GOP 600 is described as including eight frames and that only one ARF is created, implementations according to this disclosure are not so limited. For example, more than one ARF can be generated. As such, given a group of pictures that includes N frames, an encoder can encode N+M frames for the GOP, where M is the number of alternate reference frames. A decoder can decode the N+M frames and display only the N frames of the GOP. The M alternate frames, along with other reference frames, can be used in decoding at least some of the N frames.

Figure 8:
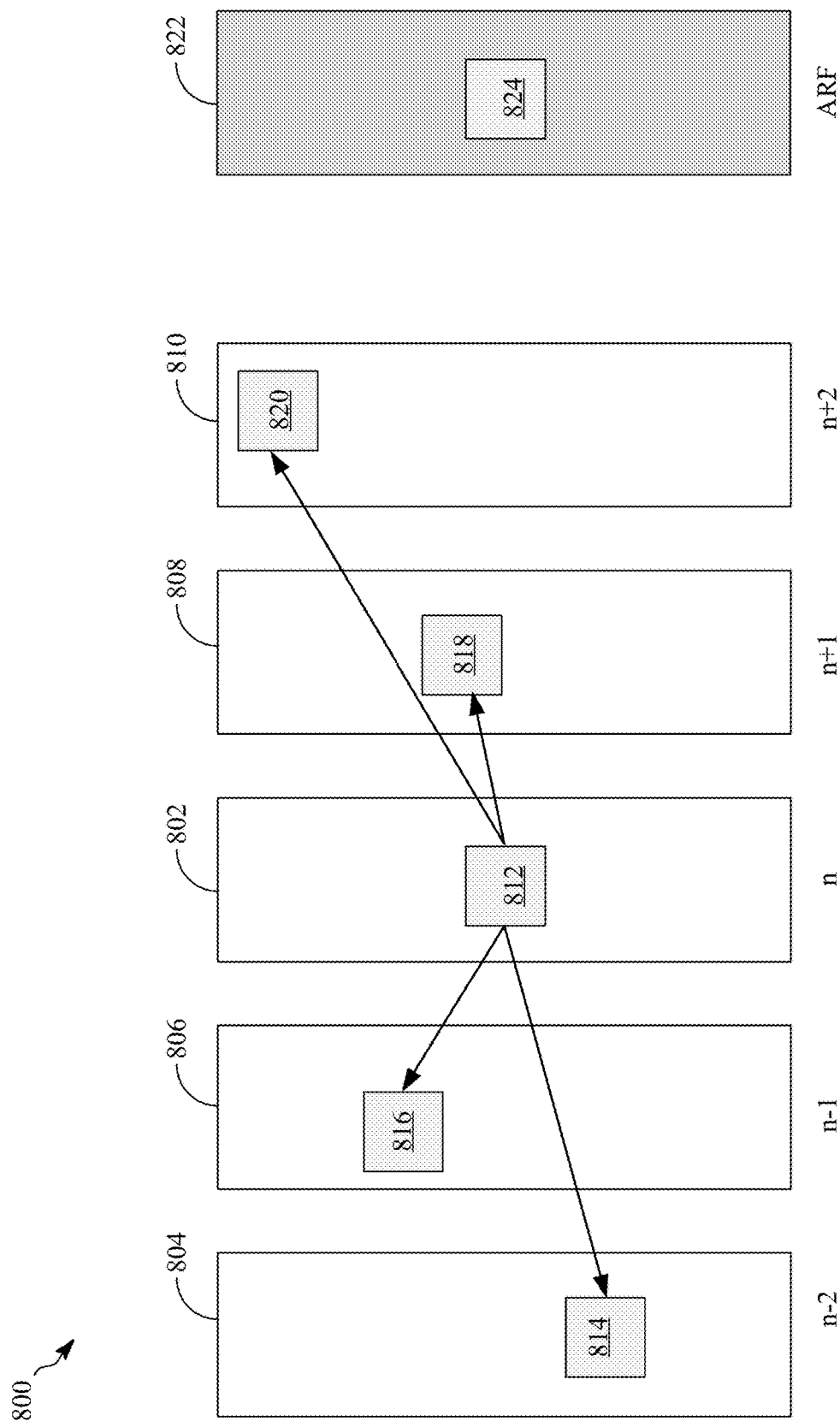
FIG. 8 is an example of a conventional technique of generating an alternate reference frame.

FIG. 8 is an example 800 of a conventional technique of generating an alternate reference frame. The example 800 illustrates temporal filtering through five consecutive source frames to generate an ARF 822. The five consecutive source frames include an anchor frame 802, two predecessor frames 804-806, and two successor frames 808-810. The anchor frame 802 is used for generating the ARF 822. The anchor frame 802 can be divided into blocks. Each of the blocks can be of size M×N. In an example, the block can be of size 16×16; however, other sizes are possible. One such block is an anchor block 812.

In an example, the anchor frame 802 can be the frame 616 of the GOP 600 of FIG. 6. That is, the anchor frame 802 can be the last frame of a group of pictures. As such, the frames 804 and 806 correspond, respectively, to the frames 614 and 616 of FIG. 6; and the ARF 822 can correspond to the ARF 618 of FIG. 6. Similarly, the frames 808 and 810 correspond, respectively, to a first frame and a second frame of the GOP (not shown) that follows the GOP 600.

In the example 800, a block corresponding to (i.e., co-located with) each M×N block (e.g., each 16×16 block) of the anchor block is generated as described below. For example, an ARF block 824 of the ARF 822 corresponds to the anchor block 812. As such, each M×N block in the anchor frame 802 can be processed (i.e., by an encoder, such as the encoder 400 of FIG. 4) as an operating unit. For each of the frames to be used for generating the ARF, a motion search can be performed (e.g., by an intra/inter prediction stage, such as the intra/inter prediction stage 402 of FIG. 4) to find, for the anchor block, respective reference blocks in each of the frames. As five frames are used in the example 800, five reference blocks are found; namely, reference blocks 814, 816, 818, and 820 in the frames 804, 806, 808, and 810, respectively.

In the conventional technique, the distance between an anchor block (e.g., the anchor block 812) and a reference block (e.g., each of the blocks 814-820) in a frame can be used to determine a weight for that frame. The distance can be in L2 norm (e.g., mean squared error). The distance can be indicative of the level of distortion between the anchor block and the reference block.

Without loss of generality, let B denote an anchor block in the anchor frame and let R denote a reference block in a frame. As such, B designates the anchor block 812; and R(n−2), R(n−1), R(n+1), and R(n+2) designate, respectively, the reference blocks 814, 816, 818, and 820.

To calculate the distance, a reference block (e.g., R(n−2)) is subtracted, pixel-wise, from the anchor block (i.e., B) and the sum of squares of the differences are summed. As such, the distance, D(B, R(k)), between the block B and a block R(k), where k corresponds to each of the reference blocks 814-820, can be calculated using formula (1):

$$D(B, R(k)) = \sum_{i=0}^{M-1} \sum_{j=0}^{N-1} ((B(i,j) - R_k(i,j))^2) \quad (1)$$

In an example, if the distance is greater than a threshold, the block can be ignored. For example, a weight of zero can be assigned to the block if the sum is greater than the threshold. As such, the weight can be determined using a clamping function as shown in formula (2). In formula (2), the threshold used is 16; however, other threshold values can be used. In another example, a threshold of 32 can be used.

$$c(k) = \text{clamp}(0, 16, 16 - D(B, R(k))) \quad (2)$$

In the formula (2), c(k) is the weight to be used for the pixels of the reference block in the frame k, where k corresponds to the reference blocks R(n−1), R(n−1), R(n+1), and R(n+2). The clamping function clamp( ) of formula (2) takes 3 arguments: the first argument corresponds to a lower limit; the second argument corresponds to an upper limit; and the third argument is the value to be clamped to a value that is between the lower limit and the upper limit, inclusive. As such, if (B, R(k)) is less than 0, then 0 is assigned to c(k); if (B, R(k)) is greater than 16, then 16 is assigned to c(k). The formula (2) illustrates that a higher distance D(B, R(k)) results in a lower weight c(k).

The values of the ARF block 824 can be calculated using formula (3):

$$\text{ARF block} = \frac{\begin{array}{c}c(n-2)*R(n-2) + c(n-1)*R(n-1) + \\ 16*B + c(n+1)*R(n+1) + c(n+2)*R(n+1)\end{array}}{(c(n-2) + c(n-1) + 16 + c(n+1) + c(n+2))} \quad (3)$$

As mentioned above, the "16" of formula (3) corresponds to the "16" of the clamping function of formula (2). Formula (3) illustrates that temporal filtering, to generate an alternate reference block (e.g., the ARF block 824) of the alternate reference frame (i.e., the ARF 822), can be accomplished by summing the weighted reference blocks and the anchor block (i.e., as shown in the numerator of the formula (3)) and normalizing the result (i.e., as shown in the denominator of the formula (3)). In formula (3), the weights c(k) are scalar values; B and R(k) are two-dimensional matrices of pixel values.

In an alternative conventional technique, the filter coefficients can be computed on a pixel-by-basis by, for example, comparing corresponding pixels in two motion-aligned blocks, and using the distance between the two pixels to form the filter weight. The alternative conventional technique may better capture the statistical difference within the pixel block because it can identify pixel level misalignment due to non-translational motion activities. However, the alternative conventional technique can easily be trapped by acquisition noise (or film grains) that randomly perturbs pixel values even if the pixels belong to the same motion trajectory. Implementations according to this disclosure solve this problem by introducing a patch-based distance measurement to form an adaptive temporal filter kernel.

Figure 9:
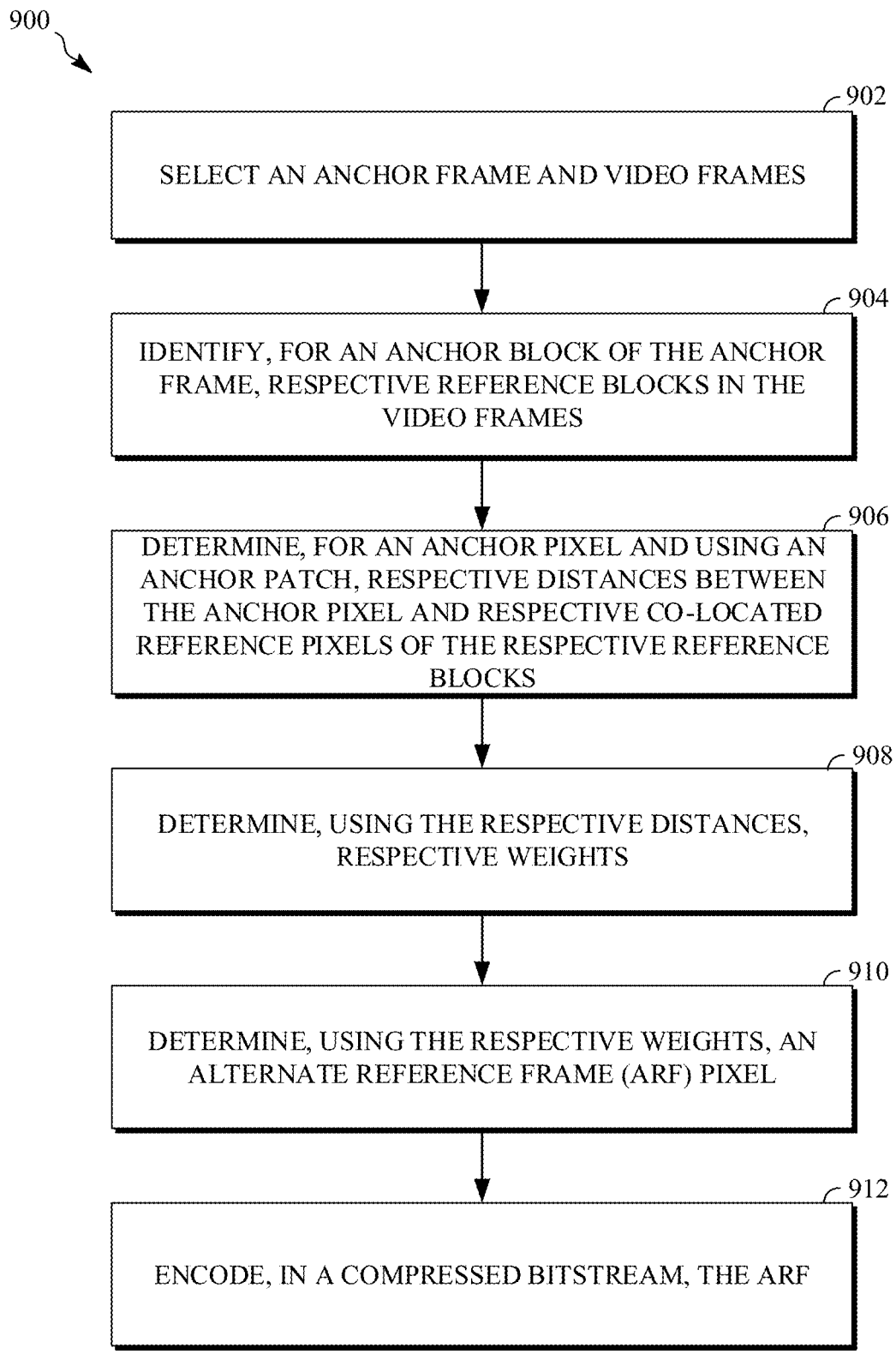
FIG. 9 is a flowchart diagram of a process for using an alternate frame reference (ARF) according to implementations of this this disclosure.

FIG. 9 is a flowchart diagram of a process 900 for using an alternate frame reference (ARF) according to implementations of this this disclosure. The process 900 can be implemented, for example, as a software program that can be executed by computing devices such as transmitting station 102 or receiving station 106. The software program can include machine-readable instructions that can be stored in a memory such as the memory 204 or the secondary storage 214, and that, when executed by a processor, such as CPU 202, can cause the computing device to perform the process 900. The process 900 can be implemented in whole or in part in the intra/inter prediction stage 402 of the encoder 400. The process 900 can be implemented using specialized hardware or firmware. Multiple processors, memories, or both, can be used.

Using an anchor frame and other video frames, the process 900 generates an alternate reference frame (ARF), which can be used by the encoder (and a decoder) when performing inter prediction. The anchor frame and the video frames can be frames of a source input video stream, such as the video stream 300 of FIG. 3.

As compared to the distance measurement described with respect to a conventional approach, where the same weight is applied to each pixel of the anchor block, the process 900 uses the localized information about (e.g., around, in the neighborhood of, etc.) a pixel to determine the weights to be used in the temporal filtering. As such, different weights, which are based on the respective local neighborhoods, are used.

Figure 10:
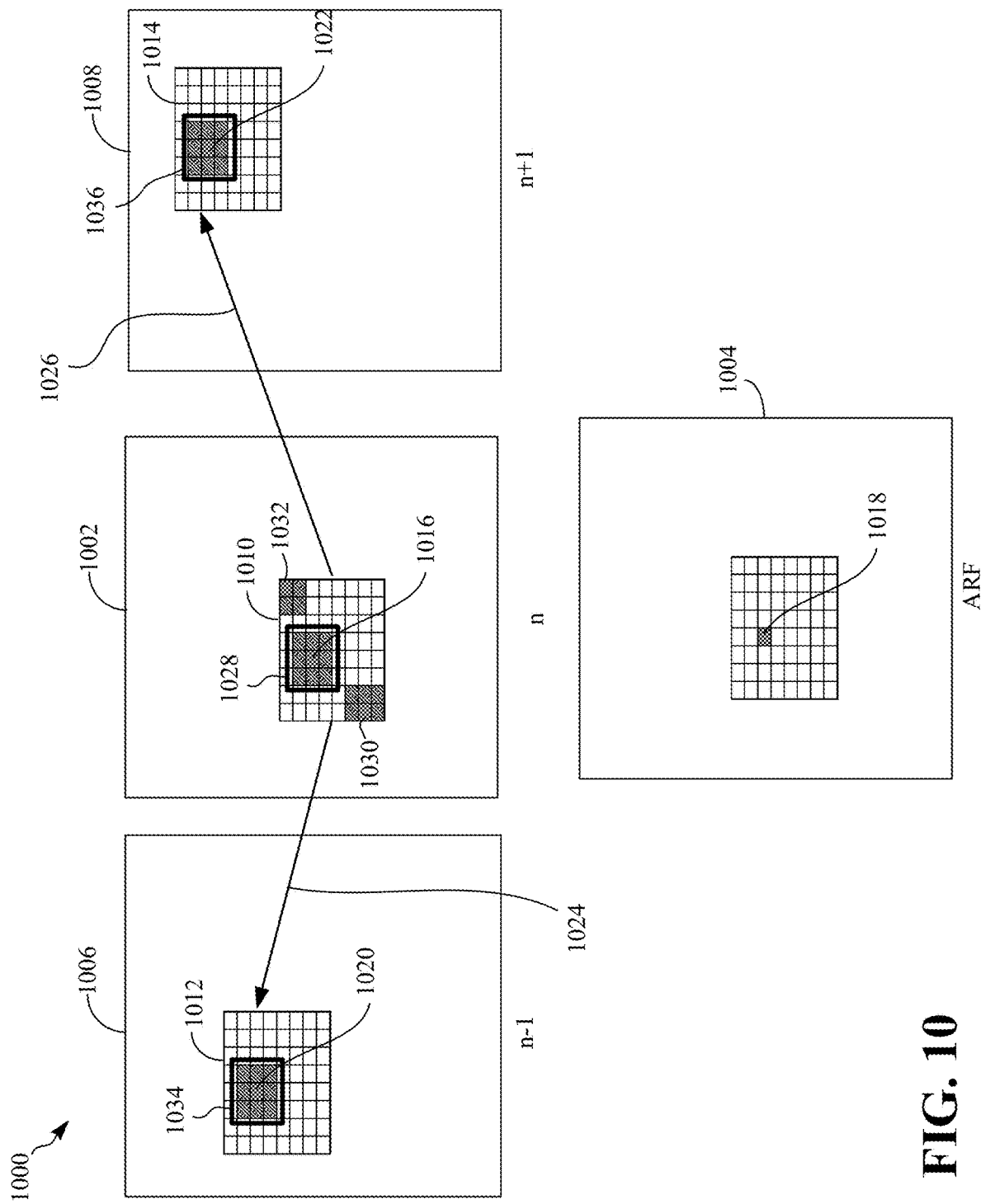
FIG. 10 is an example of generating an alternate reference frame according to implementations of this disclosure.

The process 900 is explained with reference to FIG. 10. FIG. 10 is an example 1000 of generating an alternate reference frame according to implementations of this disclosure. In the example 1000, an ARF 1004 is generated, such as by the process 900, using an anchor frame 1002 and other video frames.

As is known in the art, a pixel can have an associated color space. For example, in a YCrCb or YUV color space, Y is a luminance component, and Cr or U and Cb or V are color difference components. As such, a pixel can include information representing an image captured in the frame, such as luminance information and color information. A pixel can also include location information. As such, a block (e.g., the anchor block 1010, the reference block 1012, and the reference block 1014) can include a luminance block (not shown) and two chrominance blocks (not shown), such as a U or Cb chrominance block, and a V or Cr chrominance block. Various sampling formats have been defined, including 4:4:4, 4:2:2, and 4:2:0.

"Pixel" as used herein, and unless otherwise the context indicates, can refer to the value of a color component of a pixel at a location. For example, reference to "the anchor pixel 1016" can mean (e.g., indicate, refer to, etc.) the pixel that is at Cartesian coordinates (4, 3) of the anchor block 1010, the luminance value at that location, the U chrominance value at that location, the V chrominance value at that location, or a combination thereof.

At 902 of FIG. 9, the process 900 selects an anchor frame and video frames. As used in this disclosure, "select" means to create, form, produce, identify, construct, determine, specify, generate, or other select in any manner whatsoever.

In the example 1000 of FIG. 10, two video frames are shown; namely, a frame 1006 and a frame 1008. The example 1000 shows the anchor frame 1002 and the frames 1006 and 1008 as being consecutive frames in the input video stream: the frame 1006, the anchor frame 1002, and the frame 1008 are, respectively, frame numbers n−1, n, and n+1 in the input video stream. However, that need not be the case.

In an example, and as described with respect to FIG. 8, the anchor frame 1002 can be the last frame of a group of pictures (GOP) and some of the video frames (i.e., predecessor frames in display order) used to generate the ARF 1004 can be frames from the same GOP as the anchor frame 1002 and some others of the video frames (i.e., successor frames in display order) can be frames from a subsequent GOP. As such, the video frames can include first video frames and second video frames, the first video frames and the anchor frame can be frames of a first group of pictures, and the second video frames can be frames of a second group of pictures that is different from the first group of pictures.

In an example, the anchor frame can be a frame that is between the first and the last frame in a GOP. As such, some of the predecessor frames can be frames in the same GOP, some of the predecessor frames can be frames in a preceding GOP, some of the successor frames can be frames of the same GOP as the anchor frame, some of the successor frames can be frames of the succeeding GOP as the anchor frame, or a combination thereof.

As described with respect to the example 800 of FIG. 8, four other frames can be used. In other examples, more than four frames can be used. The number of video frames can be even (i.e., a multiple of 2 that is greater than 0) and the anchor frame can be centered between the video frames.

As mentioned with respect to FIG. 8, the anchor frame 1002 can be divided into blocks. Blocks of the anchor frame 1002 are referred to herein as anchor blocks to differentiate them from blocks of the other video frames. As such, the anchor frame 1002 can be partitioned into anchor blocks of size M×N pixels. In an example, each anchor block can be of size 16×16 pixels; that is, M=N=16. However, other sizes are possible. Assuming a raster scan order of the anchor blocks, anchor blocks at the right and/or bottom boundaries of the anchor frame may be smaller than M×N, depending on the size of the anchor frame. An anchor block includes anchor pixels. For example, an anchor block of size M×N (e.g., 16×16) includes M*N (e.g., 256) pixels. An anchor block 1010 of FIG. 10 is an example of an anchor block. The anchor block 1010 is shown as being of size 8×8 pixels (i.e., an 8×8 block); however, the size of the anchor block can be different. The anchor block 1010 includes 8*8=64 anchor pixels, which include an anchor pixel 1016.

At 904 of FIG. 9, the process 900 identifies, for the anchor block of the anchor frame, respective reference blocks in the video frames. The respective reference blocks can be identified in any number of ways.

For example, a prediction unit, such as a unit of the intra/inter prediction stage 402 of FIG. 4 can conduct motion search in each of the video frames to identify a closest matching block within respective search windows in each of the video frames. FIG. 10 illustrates the respective reference blocks. A reference block 1012 of the frame 1006 can be the reference block that is identified using motion search, as indicated by a motion vector 1024. A reference block 1014 of the frame 1008 can be the reference block that is identified using motion search, as indicated by a motion vector 1026. A reference block can be at an integer pixel location or at a sub-pixel location.

In another example, the respective reference frames can be identified as being the co-located blocks in each of the reference frames. For example, if the top-left pixel of the anchor block 1010 is at Cartesian location (x, y) (e.g., (32, 32)) of the anchor frame, then the reference blocks 1012 and 1014 can be the 8×8 blocks whose top-left pixels are at locations (x, y) (e.g., (32, 32)) of the frames 1006 and 1008, respectively.

At 906 of FIG. 9, the process 900 determines, for the anchor pixel and using an anchor patch, respective distances between the anchor pixel and respective co-located reference pixels of the respective reference blocks.

An anchor patch includes a set of pixels about the anchor pixel and/or in the neighborhood of the anchor pixel. In an example, the anchor patch can be a 3×3 window that is centered at/by the anchor pixel, as illustrated by an anchor patch 1028 of FIG. 10. The anchor patch 1028 includes the anchor pixel 1016 and the eight surrounding pixels (i.e., the shaded pixels). The anchor patch can include more or fewer pixels. The anchor patch can have a square, rectangular, or any other shape.

In an example, pixels of an anchor patch that are not part of the anchor block can be excluded from the anchor patch. For example, with respect to anchor pixels 1030 and 1032, the corresponding anchor patches include only those shaded pixels that are part of the anchor block 1010. In another example, the anchor patch can include pixels that are outside of the anchor block but that are within the anchor frame.

A respective distance between the anchor pixel and a respective co-located reference pixel is determined using the anchor patch pixels and co-located reference pixels. In the reference block 1012, The co-located reference pixels of the anchor pixels of the anchor patch in the reference blocks 1012 and 1014 are indicated by the bounding boxes 1034 and 1036, respectively.

The respective distance can be calculated using formula (4). Let b(x, y) denotes a pixel in the anchor block (denoted B) at position (x, y). Similarly, let r(x, y) denote a pixel in a reference block R at the same position. With respect to FIG. 10, the block B can be the anchor block 1010 and the reference block R can be the reference block 1012 or the reference block 1014. The distance measurement between the two pixels, D(b(x, y),r(x,y)), is given by formula (4):

$$D(b(x, y), r(x, y)) = \sum_{i=-1}^{1} \sum_{j=-1}^{1}((b(x+i, y+j) - r(x+i, y+j))^2) \quad (4)$$

As such, formula (4) can be used to determine a first distance between the anchor pixel 1016 (i.e., b(x, y)) and a co-located reference pixel 1020 (e.g., r(x, y)) in the reference block 1012, and a second distance between the anchor pixel 1016 (i.e., b(x,y)) and a co-located reference pixel 1022 (e.g., r(x, y)) in the reference block 1014. The formula (4) is used to calculate a distance between two patches: an anchor patch of an anchor frame and a co-located anchor patch in the reference frame.

At 908 of FIG. 9, the process 900 determines (e.g., identifies, calculates, etc.), using the respective distances, respective weights. The distances (e.g., the first distance and the second distance) can be clamped using formula ( 5 ) to determine the respective weight for a pixel of a reference frame:

$$c_R(x, y) = \text{clamp}(0, 16, 16 - D(b(x, y), r(x, y))/9) \quad (5)$$

In formula (5), "9" corresponds to the number of terms in formula (4); $c_R(x, y)$ is the weight to be assigned to the pixel at location (x, y) of the reference block R (i.e., the reference frame what contains the pixel r(x, y)).

At 910 of FIG. 9, the process 900 determines, using the respective weights, an ARF pixel that is co-located with the anchor pixel. That is, the weights can be used to calculate (e.g., determine, etc.) pixel values of the ARF. As such, the value of a pixel (e.g., an ARF pixel 1018) at location (x, y) (i.e., co-located with the anchor pixel 1016) of the ARF (i.e., the ARF 1004) can be calculated using formula (6):

$$ARF(x, y) = \frac{(16*b(x, y)) + \sum_{k=1}^{P} c_k(x, y) * r_k(x, y)}{16 + \sum_{k=1}^{P} c_k(x, y)} \quad (6)$$

In formula (6), ARF(x, y) denotes the value of the pixel of the alternate reference frame at location (x, y); P denotes the number of reference frames (e.g., 2 frames in example 1000; namely, the frames 1006 and 1008); and k is a variable that denotes a specific reference frame. The weight $c_k(x, y)$ denotes the weight to be applied to (e.g., used with, multiplied by, etc.) the pixel $r_k(x, y)$ of the reference block k. The weight $c_k(x, y)$ is as described with respect to formulae (4) and (5). b(x, y) is the anchor pixel and the "16" corresponds to the maximum clamping value. As such, the highest weight value can be assigned to the anchor pixel.

The formulae (4)-(6), can be used to determine (e.g., calculate, etc.) respective values of each of the pixels of the ARF 1004 that are co-located with the anchor pixels of the anchor block 1010. Similarly, the formulae (4)-(6) can be used to determine values of ARF pixels corresponding to other anchor blocks of the anchor frame 1002.

At 912 of FIG. 9, the process 900 encodes the ARF in a compressed bitstream. The compressed bitstream can be the compressed bitstream of FIG. 4. Encoding the ARF can be as described with respect to encoding any other frame of the video stream such as described with respect to FIG. 4.

As mentioned above, the ARF is a reference frame and, as such, can be stored in a reference frame buffer and can be used for encoding other video frames. A decoder, such as the decoder 500 of FIG. 5, can receive the ARF in the compressed bitstream, decode the ARF, and use it in decoding other frames that are encoded in the compressed bitstream.

The formulae (4)-(6) can be used to separately calculate, for a pixel of the ARF, values for each of the color components (e.g., Red, Green, and Blue, in the case that an RGB color system is used. For example, formulae (4)-(6) can be used to separately calculate, for a pixel of the ARF a luminance value, a chrominance U value, and a chrominance V value. For example, when calculating the luminance Y value, then b(x, y), r(x, y), and ARF(x,y) each corresponds to the luminance value of the respective pixel. Similarly, when calculating a chrominance value (e.g., U or V value), then b(x, y), r(x,y), and ARF(x,y) each corresponds to the chrominance value. That is, the technique described above uniformly applies to both luminance or chrominance component planes. Each color plane operates independently of the other color planes. That is, for example, the respective distances can be distances in the luminance color plane and the ARF pixel can be a luminance pixel. For example, the respective distances can be distances in a chrominance color plane and the ARF pixel can be in the same chrominance color plane. More generally, the respective distances can be distances in a particular color plane and the ARF pixel can be a pixel value in the particular color plane.

The patch-based distance measurement described above, and which determines the temporal filtering weight, optimizes the trade-off between flexibility for pixel-level temporal consistency detection and stability over the acquisition noise imposed on the pixel values. The patch-based distance (or, equivalently, weight) determination in adaptive temporal filtering for alternate frame reference described herein can improve the compression performance by 0.7-1.5%.

In some examples, the color component values are not independently determined. It is observed that the luminance and the collocated chrominance pixel, together, form a colored pixel representation in the frame. As such, the chrominance and the co-located chrominance values of at a pixel location likely belong to the same motion object. Thus, in some examples, the distortion metrics (i.e., the distances) for the luminance and the chrominance components can be modified as described below.

For a luminance pixel value b(x, y) and a luminance reference pixel r(x, y), the patch-based distance measurement of formula (4) can be modified to further include at least one of the chrominance components from the U or V planes that are collocated with the luminance component. Formula (7) shows a modified distance measurement, $D_m(x, y)$, that includes both U and V components:

$$D_m(x, y) = \frac{D(b(x, y), r(x, y)) + (b_u(x, y) - r_u(x, y))^2 + (b_v(x, y) - r_v(x, y))^2}{11} \quad (7)$$

In formula (7), D(b(x, y), r(x, y)) is as described with respect to formula (4) for calculating a distance based on the luminance values; $b_u(x, y)$, $r_u(x, y)$, $b_v(x, y)$, and $r_v(x, y)$ correspond, respectively, to the chrominance U value of the anchor pixel, the chrominance U value of the co-located reference pixel of a reference frame, the chrominance V value of the anchor pixel, and the chrominance V value of the co-located reference pixel of a reference frame; and the value of the denominator (i.e., 11) corresponds to the number of terms in the numerator.

For a chrominance pixel value b(x,y) (either the U chrominance component or the V chrominance component) and a chrominance reference pixel r(x, y), the patch-based distance measurement of formula (4) can be modified to further include the luminance component from the Y plane that is collocated with the chrominance component. As such, in a case of determining a chrominance value of the ARF pixel, a Y luminance value that is collocated with a chrominance component of the anchor pixel can be included in the determining the respective distance. Formula (8) shows a modified distance measurement, $D_m(x, y)$, that includes the luminance component:

$$D_m(x, y) = \frac{D(b(x, y), r(x, y)) + (b_l(x, y) - r_l(x, y))^2}{\text{DENOMINATOR}} \quad (8)$$

In formula (8), D(b(x, y), r(x, y)) is as described with respect to formula (4) for calculating a distance based on the chrominance values; $b_l(x, y)$ and $r_l(x, y)$ correspond, respectively, to the luminance Y value of the anchor pixel and the luminance Y value of the co-located reference pixel of a reference frame; and the denominator, DENOMINATOR, is equal to the number of terms in the numerator. The number of terms in the numerator, in turn, depends on the sampling format used. As mentioned above, two of the formats used are the 4:4:4 (also referred to as YUV444) and 4:2:0 (also referred to as YUV420) formats.

The YUV444 format has the same number of luminance and chrominance pixels. As such, DENOMINATOR in formula (8) is equal to 10 (i.e., 9 chrominance pixels in the same plane plus 1 luminance pixel in the luminance plane).

In the YUV420 format, every 2×2 luminance pixels correspond to 1 U chrominance plane pixel and 1 V chrominance plane pixel. That is, in the YUV420 format, 1 chrominance pixel has 4 collocated luminance pixels. As such, in formula (8), a luminance value actually includes four luminance values. As such, in the YUV420 format, the luminance pixel term in formula (8) (i.e., $(b_l(x, y) - r_l(x, y))^2$) contains four pixel differences (i.e., one squared difference for each of the luminance values). As such, the normalization term (i.e., DENOMINATOR in formula (8)) is equal to 13.

The cross-plane referencing, described with respect to formulae (7)-(8), has been found to result in PSNR_U and PSNR_V metric improvements of by 0.5-0.9% in the coding of the chrominance components, and a 0.1% coding gains of the luminance component.

For simplicity of explanation, the process 900 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for using an alternate frame reference (ARF), comprising:
   selecting an anchor frame and video frames, wherein
      the anchor frame comprises an anchor block, and
      the anchor block comprises an anchor pixel;
   identifying, for the anchor block of the anchor frame, respective reference blocks in the video frames;
   determining, for the anchor pixel and using an anchor patch, respective distances between the anchor pixel and respective co-located reference pixels of the respective reference blocks, wherein
      the anchor patch comprises anchor patch pixels in a neighborhood of the anchor pixel, and
      a respective distance, of the respective distances, between the anchor pixel and a respective co-located reference pixel is determined using respective differences between each patch of pixel of the anchor patch pixels and a corresponding reference pixel of the co-located reference pixels;
   determining, using the respective distances, respective weights;
   determining, using the respective weights, an ARF pixel that is co-located with the anchor pixel; and
   encoding, in a compressed bitstream, the ARF.

2. The method of claim 1, wherein the anchor patch is of size 3×3.

3. The method of claim 1, wherein the anchor frame is a last frame of a group of pictures.

4. The method of claim 1, wherein
   the video frames comprises first video frames and second video frames,
   the first video frames and the anchor frame being frames of a first group of pictures, and
   the second video frames being frames of a second group of pictures that is different from the first group of pictures.

5. The method of claim 1, wherein the video frames comprises four frames.

6. The method of claim 1, wherein determining, using the respective distances, the respective weights comprises:
   clamping the respective distances to determine the respective weights.

7. The method of claim 1, wherein the respective distances are distances in a particular color plane and the ARF pixel is a pixel value in the particular color plane.

8. The method of claim 1, wherein determining the respective distance comprises:
   in a case of determining a luminance value of the ARF pixel, including, in the determining the respective distance, at least of one of a U chrominance value or a V chrominance value that is collocated with a luminance component of the anchor pixel.

9. The method of claim 1, wherein determining the respective distance comprises:
   in a case of determining a chrominance value of the ARF pixel, including, in the determining the respective distance, a Y luminance value that is collocated with a chrominance component of the anchor pixel.

10. The method of claim 9, wherein the Y luminance value comprises four luminance values.

11. An apparatus for using an alternate frame reference (ARF), comprising:
   a memory; and
   a processor, the processor configured to execute instructions stored in the memory to:
      select an anchor frame and video frames, wherein
         the anchor frame comprises an anchor block, and
         the anchor block comprises an anchor pixel;
      identify, for the anchor block of the anchor frame, respective reference blocks in the video frames;
      determine, for the anchor pixel and using an anchor patch, respective distances between the anchor pixel and respective co-located reference pixels of the respective reference blocks, wherein
         the anchor patch comprises anchor patch pixels in a neighborhood of the anchor pixel, and
         a respective distance, of the respective distances, between the anchor pixel and a respective co-located reference pixel is determined using the anchor patch pixels and co-located reference pixels;
      determine, using the respective distances, respective weights;
      determine, using the respective weights, an ARF pixel that is co-located with the anchor pixel; and
      encode, in a compressed bitstream, the ARF.

12. The apparatus of claim 11, wherein the anchor patch is of size 3×3.

13. The apparatus of claim 11, wherein the anchor frame is a last frame of a group of pictures.

14. The apparatus of claim 11, wherein
the video frames comprises first video frames and second video frames,
the first video frames and the anchor frame being frames of a first group of pictures, and
the second video frames being frames of a second group of pictures that is different from the first group of pictures.

15. The apparatus of claim 11, wherein the video frames comprises four frames.

16. The apparatus of claim 11, wherein to determine, using the respective distances, the respective weights comprises to:
clamp the respective distances to determine the respective weights.

17. The apparatus of claim 11, wherein the respective distances are distances in a particular color plane and the ARF pixel is a pixel value in the particular color plane.

18. The apparatus of claim 11, wherein to determine he respective distance comprises to:
in a case of determining a luminance value of the ARF pixel, include, in the determining the respective distance, at least of one of a U chrominance value or a V chrominance value that is collocated with a luminance component of the anchor pixel.

19. The apparatus of claim 11, wherein to determine the respective distance comprises to:
in a case of determining a chrominance value of the ARF pixel, include, in the determining the respective distance, a Y luminance value that is collocated with a chrominance component of the anchor pixel.

20. An apparatus for decoding using an alternate frame reference (ARF), comprising:
a memory; and
a processor, the processor configured to execute instructions stored in the memory to:
decode, from a compressed bitstream, the ARF, wherein an encoder generated the ARF by operations including:
selecting an anchor frame and video frames, wherein the anchor frame comprises an anchor block, and the anchor block comprises an anchor pixel;
identifying, for the anchor block of the anchor frame, respective reference blocks in the video frames;
determining, for the anchor pixel and using an anchor patch, respective weights based on respective patch-based distances between the anchor pixel and respective co-located reference pixels of the respective reference blocks, wherein a patch-based distance tween the anchor pixel and a respective co-located reference pixel of a reference block of the respective reference blocks is determined using each patch pixel of patch pixels of the anchor patch and a corresponding reference pixel of the reference block, wherein the patch pixels are in a neighborhood of the anchor pixel; and
determining, using the respective weights, an ARF pixel that is co-located with the anchor pixel; and
decode, using the ARF, frames from the compressed bitstream.

* * * * *